United States Patent Office 3,234,251
Patented Feb. 8, 1966

3,234,251
POLYMERIZATION CATALYSTS WHICH ARE THE SOLID REACTION PRODUCTS OF ORGANO-METALLIC COMPOUNDS AND KETONES
Kenneth T. Garty, Somerville, and Thomas B. Gibb, Jr., Murray Hill, N.J., assignors to Union Carbide Corporation, a corporation of New York
No Drawing. Filed Nov. 29, 1963, Ser. No. 327,093
3 Claims. (Cl. 260—429.9)

This invention relates to polymerization catalysts. More particularly, this invention relates to catalysts which effect relatively high conversions of monomer, such as oxirane monoepoxides, to polymer in a relatively short period of time.

Polymerization of oxirane monoepoxides in the presence of an organometallic compound, such as dibutyl zinc, which serves as a catalyst for the polymerization reaction, has been found to be desirable as the polymers produced are hard solids which are useful in the manufacture of various shaped articles and in the preparation of film material which can be used in the manufacture of bags, wrapping material and the like. Moreover, the organometallic compound remaining in the polymer at the termination of the polymerization reaction can be converted into an inert, non-deleterious residue, which can be left in the polymer if so desired, by a simple operation wherein the polymer is contacted with water or aqueous ethyl alcohol. Consequently, solid polymers produced by polymerizing an oxirane monoepoxide in the presence of an organometallic compound do not require any elaborate and time consuming purification operations in order to remove catalyst residue therefrom.

The extensive use of organometallic compounds as catalysts for the polymerization of oxirane monoepoxides to produce solid polymers has been seriously limited, however, due to the relatively long periods of time required in order to obtain any significant polymer yields. In addition, it has not been possible to obtain reproducible yields of solid polymer using organometallic compounds as catalysts. Yields obtained have varied from batch to batch and have been relatively small.

The present invention provides catalysts which effect relatively high conversions of monomer to polymer in a relatively short period of time, and in addition, allow for reproducibility of polymer yields.

The catalysts of this invention are solid reaction products of an organometallic compound and a ketone.

The amount of ketone employed in producing the reaction products in accordance with this invention, can vary from about 0.01 to about 3 moles, per mole of the organometallic compound. Optimum amounts are about 0.5 to about 2.4 moles of ketone, per mole of the organometallic compound.

Organometallics which can be employed as one of the reactants can be represented by the formula:

$$R_1-Me-R_2$$

wherein Me is a metal of Group II of the Periodic Table, i.e., beryllium, magnesium, calcium, zinc, strontium, cadmium, barium, mercury, and radium; and wherein $R_1$ and $R_2$ are hydrocarbon radicals such as alkyl, aryl, aralkyl, alkaryl, cycloalkyl and the like. Particularly desirable organometallics are those compounds having the structural formula noted above wherein $R_1$ and $R_2$ are hydrocarbon radicals having from 1 to 10 carbon atoms and being free of olefinic and acetylenic unsaturation.

Representative $R_1$ and $R_2$ radicals include, among others, methyl, ethyl, propyl, isopropyl, n-butyl, isobutyl, allyl, 2-ethylhexyl, dodecyl, octadecyl, phenyl, tolyl, xylyl, benzyl, phenethyl, phenylpropyl, phenylbutyl, cyclopentyl, cyclohexyl, cycloheptyl, 3-propylcyclohexyl and the like.

Illustrative of organometallic compounds can be noted diethyl zinc, diisopropylzinc, di-n-propyl zinc, di-n-butyl zinc, di-n-octadecyl zinc, dicyclohexyl zinc, diphenyl zinc, di-o-tolyl zinc, diethyl magnesium, di-n-butyl magnesium, di-n-octyl magnesium, diphenyl magnesium, diethyl beryllium, dimethyl beryllium, diethyl cadmium, di-n-propyl cadmium, diisoamyl cadmium, diphenyl cadmium and the like. The organometallics are known compounds and can be prepared according to the methods described in Berichte 63, 1138 (1934); 59, 931 (1926).

Any aromatic or aliphatic ketone, free of interfering functional groups, i.e., an ester group, an acid group, an aldehyde group, and an amino group, can be used in accordance with the present invention. Particularly desirable ketones are those wherein one of the hydrocarbon groups attached to the bivalent ketonic group

is an aliphatic, saturated hydrocarbon group having up to 10 carbon atoms.

Illustrative of suitable mono ketones can be noted dimethyl ketone, methyl ethyl ketone, methyl propyl ketone, methyl octyl ketone, methyl nonyl ketone, methyl phenyl ketone, methyl naphthyl ketone, diethyl ketone, ethyl methyl ketone, ethyl isopropyl ketone, ethyl butyl ketone, ethyl isobutyl ketone, ethyl isoamyl ketone, ethyl hexyl ketone, ethyl heptyl ketone, ethyl phenyl ketone, ethyl naphthyl ketone, dibutyl ketone, isoamyl phenyl ketone, isoamyl methyl ketone, dipentyl ketone, dihexyl ketone, hexyl methyl ketone, hexyl propyl ketone, diheptyl ketone, heptyl methyl ketone, diundecyl ketone, dihendecyl ketone, diheptadecyl ketone and the like.

The term "oxirane monoepoxide" as used herein is intended to encompass, among others, those compounds having a single terminal epoxy group, i.e.:

which are free of interfering groups, that is, an ester group, an acid group, an amino group and an aldehyde group.

Among such oxirane monoepoxides can be mentioned the epihalohydrins, such as 1,2-epoxy-3-chloropropane, 1,2-epoxy-3-bromopropane and the like; the olefin oxides, such as 1,2-epoxyethane, 1,2-epoxypropane; also, 1,2-epoxybutane, 1,2-epoxypentane, 1,2-epoxyhexane, 1,2-epoxyheptane, 1,2-epoxybutene, cyclohexene oxide 1,2-epoxyphenyl ethane, 1,2-epoxy-p-methylphenyl ethane, 1,2-epoxy-o-chlorophenyl ethane and the like; epoxyalkyl ethers such as those having the structural formula:

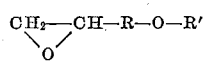

wherein R' is a hydrocarbon radical such as alkyl, aryl, alkaryl, aralkyl, allyl and the like, and wherein R is a saturated, aliphatic hydrocarbon radical. Particularly desirable polymers are those produced by polymerizing a monomer having the structural formula noted above wherein R contains from 1 to 4 carbon atoms and R' is a phenyl or alkyl substituted phenyl radical wherein the alkyl substituent contains up to 12 carbon atoms. Illustrative radicals for R include, among others, methylene, ethylene, trimethylene, tetramethylene, hexamethylene, octamethylene and the like. Representative radicals for R' include, among others, phenyl, 2-, 3-, and 4-methylphenyl, 4-isopropylphenyl, 4-tertiary butylphenyl, 4-octylphenyl, ethyl, propyl, butyl, allyl and the like.

Suitable epoxyalkyl ethers include the following:

1,2-epoxy-3-phenoxy propane,
1,2-epoxy-4-phenoxy butane,
1,2-epoxy-5-phenoxy pentane,
1,2-epoxy-6-phenoxy hexane,
1,2-epoxy-3-(o-methylphenoxy)propane,
1,2-epoxy-3-(m-methylphenoxy)propane,
1,2-epoxy-3-(p-methylphenoxy)propane,
1,2-epoxy-3-(o-isopropylphenoxy)propane,
1,2-epoxy-3-(p-tertiary butylphenoxy)propane,
1,2-epoxy-3-(p-octylphenoxy)propane,
1,2-epoxy-3-(o-chlorophenoxy)propane,
1,2-epoxy-3-(o-chlorophenoxy)propane,
1,2-epoxy-3-(2,4-dimethylphenoxy)propane,
1,2-epoxy-3-(2,3-dimethylphenoxy)propane,
1,2-epoxy-3-(2,6-dimethylphenoxy)propane,
1,2-epoxy-3-(2-chloro-4-methylphenoxy)propane,
1,2-epoxy-3-(o-amylphenoxy)propane,
1,2-epoxy-4-(o-methylphenoxy)butane,
1,2-epoxy-4-(2,4-dimethylphenoxy)butane,
1,2-epoxy-4-(2,5-dimethylphenoxy)butane,
1,2-epoxy-4-(2,4-dichlorophenoxy)butane,
1,2-epoxy-4-(2,5-dichlorophenoxy)butane,
1,2-epoxy-6-phenoxy hexane,
1,2-epoxy-6-(2,3-dibromophenoxy)hexane,
allyl glycidyl ether and the like.

The polymerization reaction is conducted by charging an oxirane monoepoxide monomer or mixture of monomers, an organometallic compound and a ketone into a reaction vessel and generally subjecting the reaction vessel to heat. Actually, the temperature at which the polymerization reaction is conducted can be varied over a wide temperature range, from about 0° C. to about 200° C., and, if desired, even higher. A temperature in the range of about 60° C. to about 175° C. is most preferred. Alternatively, the organometallic catalyst can be admixed with the ketone and the monomer added thereto.

In either event, the amount of organometallic compound charged into the reaction flask is a catalytic amount, that is, an amount sufficient to catalyze the polymerization of monomer to solid polymer. The actual quantity of organometallic compound used can be varied between wide limits, for example, from about 0.01 to about 12 percent by weight and higher, based on the weight of the monomer charged. It is preferred to charge an amount of organometallic compound in an amount of about 0.1 to about 3 percent by weight.

On contacting a ketone with an organometallic, a reaction takes place between the two which results in the formation of a reaction product, the exact nature of which is not known. In order to conclusively show that the organometallic reacts with the ketone, two reaction mixtures were prepared. Reaction mixture A contained toluene (a diluent), acetone and dibutyl zinc in a molar ratio of 1 mole of ketone to 1 mole of dibutyl zinc. Reaction mixture B contained toluene (a diluent), methyl ethyl ketone and dibutyl zinc in a molar ratio of 1 mole of ketone to 1 mole of dibutyl zinc. Each liquid mixture was allowed to stand under an argon gas atmosphere for 24 hours at a temperature of about 23° C. Samples were withdrawn from the vapor space above each liquid mixture and analyzed by vapor-phase chromatography. Infra-red spectra were also obtained on each liquid reaction mixture. Vapor-phase chromatography analysis indicated, with respect to both reaction systems, that butane was the major product. Infra-red spectra of the liquid phase of both reaction systems indicated the absence of OH groups. Concentration of each system resulted in obtaining a solid reaction product.

It is also preferred to conduct the polymerization reaction in the presence of an organic diluent which is non-reactive with respect to the monomer, catalyst and polymer. During the polymerization reaction, particularly whenever about 50 percent or more of the monomer is converted to the polymer, the reaction mixture becomes highly viscous. If a diluent is not present, it is difficult to remove the heat of reaction which, if not removed, might cause undesirable side reactions to occur. In addition, the use of a diluent facilitates removal of unreacted monomer from the polymer.

Illustrative of suitable organic diluents can be noted the aromatic hydrocarbons, such as benzene, chlorobenzene, toluene, xylene and the like; cycloaliphatics, such as cyclopentane, cyclohexane, isopropyl cyclohexane and the like; alkoxy compounds, such as methoxybenzene and the like; the dimethyl and diethyl ethers of ethylene glycol, propylene glycol, diethylene glycol; aliphatics, i.e. hexane and the like.

The diluent can be added prior to the commencement of the polymerization reaction or during the polymerization reaction in amounts of from about 5 to about 90 parts by weight per 100 parts by weight monomer and diluent.

The polymerization reaction is preferably conducted under an inert atmosphere, e.g., nitrogen and under atmospheric, subatmospheric, or superatmospheric pressures.

The crude product resulting from the polymerization of an oxirane monoepoxide usually contains, in addition to the solid polymer, some unreacted monomer, and also catalyst residue. Removal of the unreacted monomer and catalyst residue can be accomplished in any convenient manner. If desired, the catalyst residue can be left in the polymer after first treating the polymer with water or aqueous ethyl alcohol. For instance, when dibutyl zinc is the catalyst used and it is desired to allow the catalyst residue to remain in the polymer, the polymer is conveniently treated with aqueous ethyl alcohol whereby the catalyst is converted to its oxide, which oxide is inert and does not have any deleterious affect on the polymer. The ethyl alcohol is driven from the polymer by applying heat thereto. When it is desired to remove both unreacted monomer and catalyst residue from the polymer produced, as for example, poly(1,2-epoxy-3-phenoxy propane), the crude product is dispersed in a mixture of acetone and hydrochloric acid, the dispersion is then filtered, thereby obtaining the polymer as a filter-cake and, if necessary, then washing with small amounts of ethyl alcohol to obtain a white colored solid. Unreacted monomer and catalyst residue can be removed from a polymer such as poly(1,2-epoxy-ethane) by dissolving the crude product in aqueous ethyl alcohol, filtering off the catalyst residue, concentrating the solution to remove the alcohol and recovering the polymer. In general, it is desirable to remove the unreacted monomer from the crude product as the polymer recovered exhibits enhanced thermal and dimensional stability.

The percent conversion of monomer to polymer, as noted herein, was determined by recovering the polymer, drying the polymer to constant weight at a temperature of from about 50° C. to 60° C. under a pressure of 25 mm. Hg, weighing the polymer, dividing the weight of the polymer by the weight of the monomer charged, and multiplying by 100.

The reaction products of the present invention can also be hydrolyzed, to form unsaturated ketones. For example, hydrolyzing the reaction product of acetone and dibutyl zinc results in the formation of phorone. The unsaturated ketones, such as phorone, have a number of well-known uses such as solvents, thinners and as components in polymers.

In the following examples, which are illustrative of the present invention and not intended to limit the scope thereof in any manner, the reduced viscosity measurements, which are a measure of the molecular weight, were made as follows:

A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce a 25 ml. solution while maintaining the flask in a 47° C. constant temperature bath. The solution was thereafter filtered through a sintered glass funnel and the viscosity of a 3 ml. sample determined in a Cannon viscometer at about 47° C.

Reduced viscosity was computed by use of the equation:

$$RV = \frac{t_s - t_o}{c t_o}$$

where:

$t_o$ is the efflux time for the solvent
$t_s$ is the efflux time for the polymer solution
$c$ is the concentration of the solution in terms of grams of polymer per 100 ml. of solution

*Example 1*

To each of two glass tubes which had been flushed out with nitrogen gas there was charged 7.33 grams of 1,2-epoxy-3-phenoxy-propane and a solution of 0.11 gram of dibutyl zinc in 21.2 ml. of toluene. To one of the tubes there was also added acetone in an amount to provide a mole ratio of acetone to dibutyl zinc of 1:1. Both tubes were provided with a nitrogen gas atmosphere, sealed and heated at 90° C. for four hours in an air circulating oven. Each tube was then broken open and the contents thereof transferred to a Waring Blendor using 200 ml. of a mixture (50–50 on a volume basis) of acetone and toluene acidified with 5 ml. of 1 N hydrochloric acid. After thorough agitation in the Waring Blendor, the mixture was poured into ethyl alcohol. The amount of ethyl alcohol was 100 times the volume of the mixture. The polymer precipitated out of the ethyl alcohol and was recovered as a filtercake. The polymer was then washed with small quantities of ethyl alcohol, dried at 60° C. for 24 hours under a pressure of 25 mm. Hg.

The percent conversion of monomer to polymer, the mole ratio of acetone to dibutyl zinc, and the reduced viscosity of the polymer obtained are noted in the table below.

|  | Control | 1 |
|---|---|---|
| Mole ratio of acetone to dibutyl zinc | 0 | 1:1 |
| Percent conversion | 1 | 25 |
| Reduced viscosity |  | 5.5 |

The solid white colored polymer obtained was hard, tough, insoluble in water and at room temperature, insoluble in methanol, ethanol, diethyl ether, dioxane, acetone, methyl ethyl ketone, ethyl acetate, tetrahydrofuran, chloroform, methylene chloride, carbon disulfide, benzene, toluene and the like.

The 1,2-epoxy-3-phenoxy-propane used in this and in subsequent examples was purified by fractional distillation so that gas chromatographic survey showed only one major peak, that of 1,2-epoxy-3-phenoxy-propane. Toluene used in this and subsequent examples was distilled over sodium.

*Example 2*

To each of eight glass tubes which has been flushed out with nitrogen gas there was charged 7.52 grams of 1,2-epoxy-3-phenoxy-propane and a solution of 0.11 gram of dibutyl zinc in 21.2 ml. of toluene. To all but one of the tubes there was added acetone in amounts sufficient to provide a mole ratio of acetone to dibutyl zinc as indicated in the table below. The tubes were provided with a nitrogen gas atmosphere, sealed, and heated at 90° C. for 16 hours in an air circulating oven. A solid white colored polymer was recovered from each tube in a manner described in Example 1.

|  | Control | 1 | 2 | 3 | 4 | 5 | 6 | 7 |
|---|---|---|---|---|---|---|---|---|
| Mole ratio of acetone to dibutyl zinc | 0 | 0.5:1 | 1:1 | 1.2:1 | 1.5:1 | 1.7:1 | 2:1 | 2:4 |
| Percent conversion | 3.1 | 15.5 | 90 | 86 | 53 | 30 | 24 | 13 |
| Reduced viscosity | 4 | 7.1 | 7.1 | 7.1 | 4.9 | 2.6 | 2.1 | 1.9 |

This application is a continuation-in-part of our co-pending application Serial No. 824,193, filed July 1, 1959, now United States Patent 3,127,371.

Using diethyl zinc or diphenyl zinc in lieu of the dibutyl zinc in the polymerization of an oxirane monoepoxide effects substantially the same results as set forth in Example 1.

What is claimed is:

1. A catalyst which is the solid reaction product of an organometallic compound having the formula:

$$R_1—Me—R_2$$

wherein $R_1$ and $R_2$ are aromatic hydrocarbon radicals free of olefinic and acetylenic unsaturation and Me is a metal of Group II of the Periodic Table, and from about 0.01 to about 3 moles of ketone selected from the group consisting of aromatic and aliphatic ketones, per mole of said organometallic compound.

2. A reaction product as defined in claim 1 wherein the ketone is acetone.

3. A reaction product as defined in claim 1 wherein the organometallic compound is diphenyl zinc and the ketone is acetone.

References Cited by the Examiner

UNITED STATES PATENTS 2,848,426  8/1958  Newey _____ 260—2
2,870,100  1/1959  Stewart et al. _____ 260—2
2,881,156  4/1959  Pilar et al. _____ 260—94.9

OTHER REFERENCES

Coates et al.: Organo-Metallic Compounds (New York: John Wiley and Sons, Inc.) (1956), pages 38–43; pages 39 and 43 principally relied on.

Schildknecht: "Vinyl and Related Polymers," Wiley and Sons, New York, 1952, pages 234 and 424 relied upon.

TOBIAS E. LEVOW, *Primary Examiner.*